July 24, 1934.  W. L. PIERCE  1,967,758
ROAD SURFACE GAUGE
Filed June 10, 1932
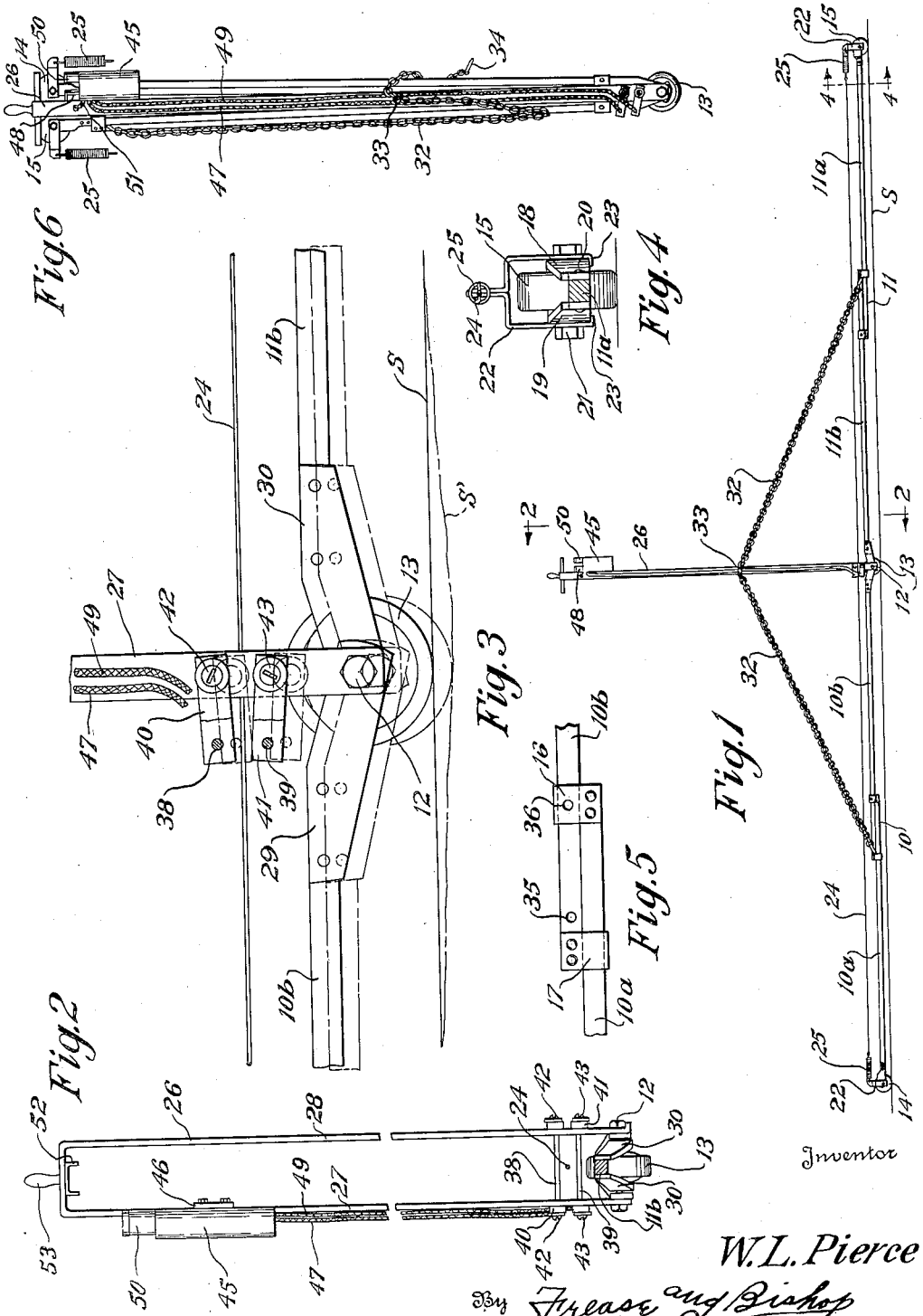

Patented July 24, 1934

1,967,758

UNITED STATES PATENT OFFICE 1,967,758

ROAD SURFACE GAUGE

William L. Pierce, Canton, Ohio

Application June 10, 1932, Serial No. 616,516

5 Claims. (Cl. 33—174)

The invention relates to apparatus for detecting variations in road surfaces from exact longitudinal alinement throughout a predetermined span, and more particularly to a gauge for indicating such variations between very narrow limits.

The specifications for a paved roadway usually require that the surface may vary only a certain amount for a certain span, as for example, one-quarter of an inch for a span of ten feet. Certain prior constructions for testing road surfaces have included a rigid beam substantially equal in length to the required span, and means mounted centrally of the beam for gauging the irregularities in the surface with respect to a straight line surface drawn between the outer ends of the beam. This type of construction is necessarily very heavy and cumbersome to handle and to transport from place to place, and also relatively inaccurate.

Other prior constructions have included a pair of bars hinged together at their inner ends upon a guide roller, and guide rollers journaled in the outer ends of the bars, but the variations at the middle roller have been transmitted to a signalling device by means of a complication of levers and the like, adding excess weight and complexity to the construction, which is far from accurate in operation.

In all of these prior constructions of which I am aware, the variations are gauged at the central portion longitudinally thereof, while the operator is positioned at one end. Accordingly, when a variation is detected, the operator must needs change his position in order to mark the pavement where the variation occurs, and then go back to the operating end of the device in order to move it further along. Obviously, this arrangement is very awkward and inefficient.

It is an object of the present invention to provide a foldable road surface gauge which is light in weight, and which gives extremely accurate results.

Another object is to provide a road surface gauge which is longitudinally adjustable for different spans.

A further object is to provide a gauge which detects variations in the road surface at the central portion of the gauge, and which is operated from said central portion.

A still further object is to provide means forming a straight-line connection between the end rollers at all times, and means carried by the middle roller and cooperating with the connection means for indicating, between narrow limits, upward or downward movement of the middle roller relative to the end rollers, due to variations in the road surface.

Other objects include the provision of a road surface gauge embodying the foregoing objectives in a simple, inexpensive and lightweight structure which is easily portable and relatively accurate.

The above and other objects are attained by the improvements comprising the present invention, which may be stated in general terms as including a pair of longitudinal members hinged together at their inner ends upon a roller, rollers journaled in their outer ends, a flexible member tautly connected between said outer rollers, an upright bar carried on the middle hinge, contacts mounted on the upright bar and located one above and one below the flexible member, and electrical signalling means connected in circuit with said contacts for indicating engagement between the flexible member and ends of said contacts.

In the drawing forming part hereof

Figure 1 is an elevational view of the improved road surface gauge in operating position;

Fig. 2 is a transverse sectional view taken substantially on line 2—2, Fig. 1;

Fig. 3 is an enlarged fragmentary elevation of the gauge at the central portion thereof;

Fig. 4 is a sectional view taken on line 4—4, Fig. 1;

Fig. 5 is an enlarged fragmentary elevation of one of the longitudinal members; and Fig. 6 is an elevational view of the gauge in folded position.

Similar numerals refer to similar parts throughout the several views.

The improved road surface gauge includes a pair of normally horizontally aligned longitudinal elongated members 10 and 11, which are hingedly connected together at their inner ends by means of the pintle 12. The pintle 12 forms the axle for an inner roller 13 which is adapted to roll upon the surface S of the roadway. A roller 14 is journaled in the outer end of the member 10, and a roller 15, preferably of equal diameter, is journaled in the outer end of the member 11.

Preferably, each of the longitudinal elongated members 10 and 11 is made lengthwise adjustable so that the distance between the rollers 14 and 15 may be varied to accommodate different spans which may be required in testing the surface of the roadway. Accordingly, the member 10 may include an outer bar 10a and an inner bar 10b having a longitudinally slidable connection therewith; and the member 11 may include an outer bar 11a and an inner bar 11b having a longitudinally slidable connection therewith.

In Figure 5 a preferred form of this longitudinally slidable connection is illustrated. The bar 10a has riveted at its inner end a U-shaped clamp 16 which slidably engirdles the bar 10b. Likewise, the bar 10b has at its outer end a U-shaped clamp 17 riveted thereto, and the clamp 17 slidably engirdles the bar 10a. Thus the bars 10a and 10b may be extended until the clamps 16 and 17 engage to give a maximum span, or they may be collapsed to give a minimum span for folding the gauge into the position shown in Fig. 6.

The manner of journaling the rollers 14 and 15 in the outer ends of the bars 10a and 11a is shown in Fig. 4. Lugs 18 and 19 are riveted to the bar 11a as shown at 20, and are bent outward therefrom so as to be located one on each side of roller 15 and permit insertion therethrough of the roller axle or pintle represented at 21.

Means for providing a straight-line connection between the outer ends of members 10 and 11 preferably includes substantially Y-shaped brackets 22 which are carried on the pintles 21 of the rollers 14 and 15 respectively, as best shown in Fig. 4. The legs of each bracket 22 are secured to the lugs 18 and 19 by means of the pintle 21, being extended downwardly therefrom, and are bent under the bottom edges of lugs 18 and 19 as shown at 23, to prevent pivotal movement of the bracket 22.

Preferably, a lightweight flexible wire 24 is stretched tautly between the brackets 22 to form a straight-line connection therebetween. Means for placing a tension upon the wire 24 may include springs 25 which are connected between the ends of the wire 24 and the brackets 22. The springs 25 are connected to the brackets 22 at equal distances above the rollers, that is, equal distances above the road surface S at the outer ends of the gauge so that the wire 24 is parallel with the mean contour of the surface determined by rollers 14 and 15.

An upright handle member 26 is preferably carried by the inner roller 13, and may be in the form of an inverted U as shown in Fig. 2. The lower ends of the legs 27 and 28 of member 26 are mounted on the pintle 12 outside of lugs 29 and 30 which are riveted to bars 10b and 11b respectively, and journaled upon the pintle 12 for providing a hinge connection between members 10 and 11.

Means for maintaining the bar 26 in a substantially upright position preferably includes chains 32 which are each secured at one end to the upright member 26 as at 33. Each of the chains preferably has at its other end a pin 34, as shown in Fig. 6, for connection with the members 10 and 11 respectively. A hole 35 (Fig. 5) is provided in the outer end portion of bar 10b in which the pin 34 may be inserted when the member 10 is not in fully extended position, as shown in Fig. 1. Another hole 36 is provided in the clamp 16 which is adapted to register with hole 35 when the member 10 is in fully extended position, so that the pin may be inserted through holes 35 and 36 for holding the member 26 in upright position and for holding the member 10 in extended position. The other chain 32 is adapted to be connected to the member 11 in the same manner.

When the apparatus is assembled there is enough slack in both chains 32 to permit the relatively slight free pivotal movement of bars 10 and 11 about the pintle 12 when the roller 13 encounters a raised or depressed portion in the surface being gauged.

Obviously, a series of the holes 35 may be provided along the lengths of bars 10b and 11b for registering with the holes 36 in a number of partially extended positions of members 10 and 11, so that by insertion of a pin or the like through the registering holes 35 and 36, the bars 10 and 11 may be held in longitudinally adjusted position.

Means for engaging the wire 24 when the roller 13 moves upwardly or downwardly relative to rollers 14 and 15 may include a contact rod 38 mounted on the upright member 26 and located above wire 24, and a contact rod 39 mounted on member 26 and located below the wire 24. These rods are pivotally mounted upon the legs 27 and 28 for adjustment toward and away from each other, by means of the insulation bars 40 and 41 respectively which are secured at their inner ends to the legs 27 and 28 by screws 42 and 43 respectively, the rod 38 being secured between the outer ends of bars 40, and the rod 39 being secured between the outer ends of bars 41.

When the gauge is positioned on a substantially level surface, that is, when the three rollers are in the same plane, the wire 24 is spaced half way between the rods 38 and 39, as shown in Fig. 2 and in the full line position in Fig. 3.

Signalling means for indicating whenever the wire 24 is engaged by either of the contact rods 38 and 39, preferably includes a two bulb flashlight indicated at 45, which is operated by the usual flashlight battery. The flashlight 45 is preferably mounted upon the member 26 near its upper end by means of an insulation plate 46. A wire conductor 47 electrically connects the bulb 48 to the contact rod 38, and a wire conductor 49 electrically connects flashlight bulb 50 with contact rod 39. The flashlight battery is grounded to the member 26 by means of conductor 51 in order to complete the circuit through either bulb.

For maintaining the gauge in the folded position shown in Fig. 6, a channel section 52 is secured in inverted position at the top of upright member 26, and arranged to receive rollers 14 and 15.

In the operation of the improved road surface gauge, the operator positions himself adjacent to the upright member 26, and moves the gauge longitudinally of the roadway by grasping the hand grip 53, which may be conveniently provided at the top of handle member 26. When the roller 13 encounters a depression in the surface of the roadway, as indicated at S' in Fig. 3, the roller and member 26 will move downwardly, the arms 10b and 11b pivoting about the hinge pintle 12. In this position, shown in dot-dash lines in Fig. 3, the upper contact rod 38 engages the wire 24, completing the circuit through conductor 47 and bulb 48 to light the same. Upon observing the lighting of bulb 48, the operator may mark the pavement at that point in a suitable manner without changing his position and without releasing his hold upon the handle 53.

In a similar fashion, if a raised portion in the roadway is encountered by the roller 13, the lower contact rod 39 will engage the wire 24 to light the bulb 50. For convenience, the bulb 48 may be marked "low" and the bulb 50 may be marked "high".

With my improved apparatus, a road surface may be accurately tested in a relatively short time and with increased efficiency, since only one operator is required, and since it is not necessary for him to shift his relative position during the operation.

By loosening the screws 42 and 43 the contact rods 38 and 39 may be moved toward or away from each other to increase or decrease the limits of variation, as required. The wire cable forms an extremely accurate gauge for testing the road surface, and the whole apparatus is very light in weight, easily manipulated, and quickly folded for transportation from place to place. Also, the herein described construction is simple and inexpensive to manufacture, and is easily adjusted for accommodating different prescribed spans, as previously described.

Obviously, any other form of signalling or indicating apparatus, such as a buzzer arrangement and the like may be substituted for the signalling apparatus shown and described, without departing from the scope of my invention as defined in the claims.

I claim:

1. In a road surface gauge having a pair of elongated normally horizontally aligned members hinged together at their inner ends upon a roller, and having rollers journalled in their outer ends, an upright handle pivotally mounted on the inner roller, means for maintaining the handle in substantially upright position, means forming a straight-line connection between the outer ends of the elongated members, and contacts on the upright handle for engaging the connection forming means when the inner roller is raised or lowered relative to the plane of the outer rollers.

2. A road surface gauge including a pair of lengthwise adjustable elongated normally horizontally aligned members hinged together at their inner ends upon a roller, rollers journalled in the outer ends of said elongated members, an upright handle pivotally mounted on said inner roller, means for maintaining the handle in substantially upright position, means connecting the outer ends of the elongated members, and means on said handle cooperating with said connecting means for indicating upward and downward movement of the inner roller relative to the plane of the outer rollers.

3. In a road surface gauge having a pair of elongated normally horizontally aligned members hinged together at their inner ends upon a roller, and having rollers journalled in their outer ends, an upright handle pivotally mounted on the inner roller, means for maintaining the handle in substantially upright position, means forming a straight-line connection between the outer ends of the elongated members, contacts on the upright handle for engaging the connection forming means when the inner roller is raised or lowered relative to the plane of the outer rollers, and electrical signalling means in circuit with the contacts and adapted to be operated by engagement between the connection forming means and either of the contacts.

4. In a road surface gauge having a pair of elongated normally horizontally aligned members hinged together at their inner ends upon a roller, and having rollers journalled in their outer ends, an upright handle pivotally mounted on the inner roller, means for maintaining the handle in substantially upright position, a flexible member connected at one end to the outer end of one elongated member and at its other end to the outer end of the other elongated member and stretched tautly therebetween, contacts on the upright handle located above and below said flexible member and arranged to engage the same when the inner roller is raised or lowered relative to the plane of the outer rollers.

5. A road surface gauge including a pair of lengthwise adjustable normally horizontally aligned bars having a hinge connection between their inner ends, a roller journaled on said hinge connection, rollers journaled in the outer ends of said bars, an upright handle bar pivotally mounted on said hinge connection, means for maintaining said bar in substantially upright position, a wire connected between the outer ends of the lengthwise adjustable bars, spring means for imposing a tension upon said wire, contact rods on the upright bar located above and below the wire for engagement therewith when the inner roller is raised or lowered relative to the plane of the outer rollers, and signalling means adapted to be operated by engagement of said contact rods with said wire.

WILLIAM L. PIERCE.